Oct. 25, 1966 B. N. WALKER ET AL 3,280,459
COMBINED AMALGAMATOR AND DISPENSER DEVICE
Filed June 5, 1963 3 Sheets-Sheet 1
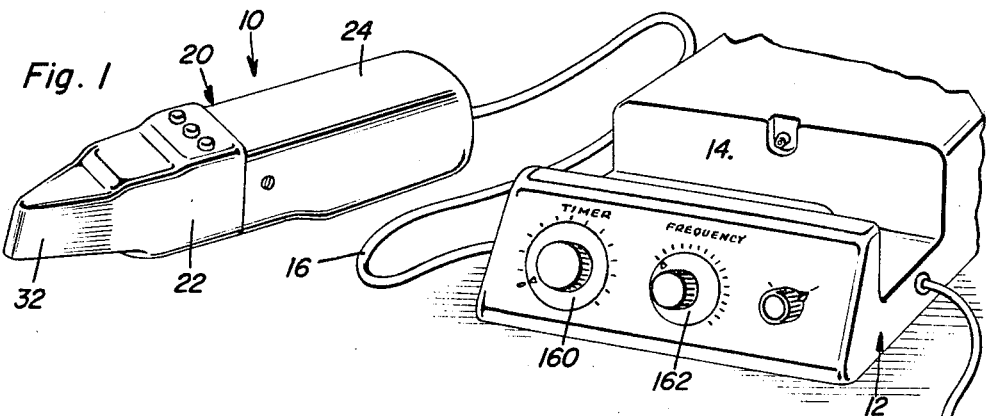
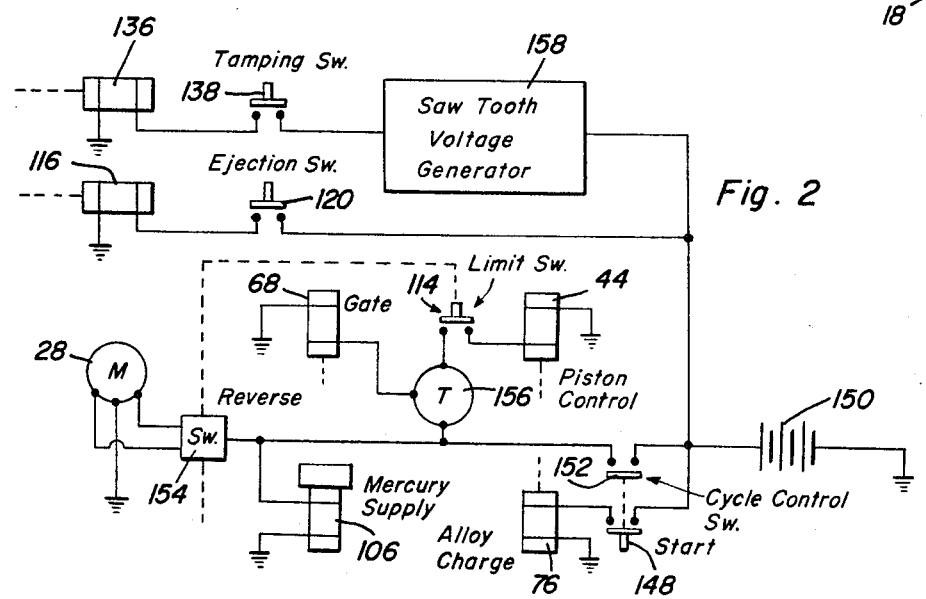
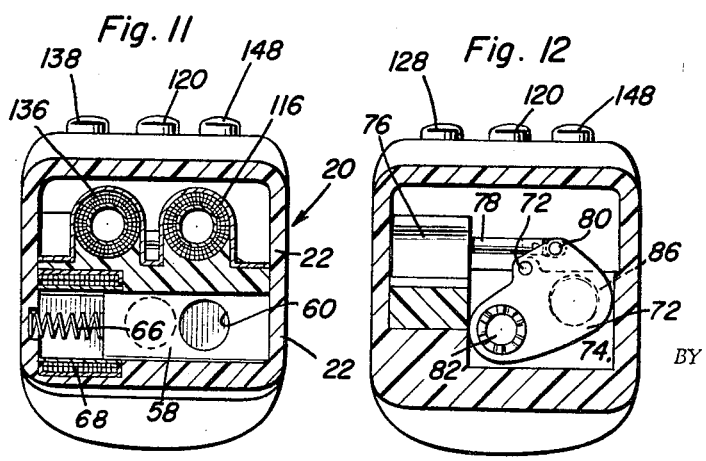
Barvo N. Walker
Gene H. Hull
INVENTORS

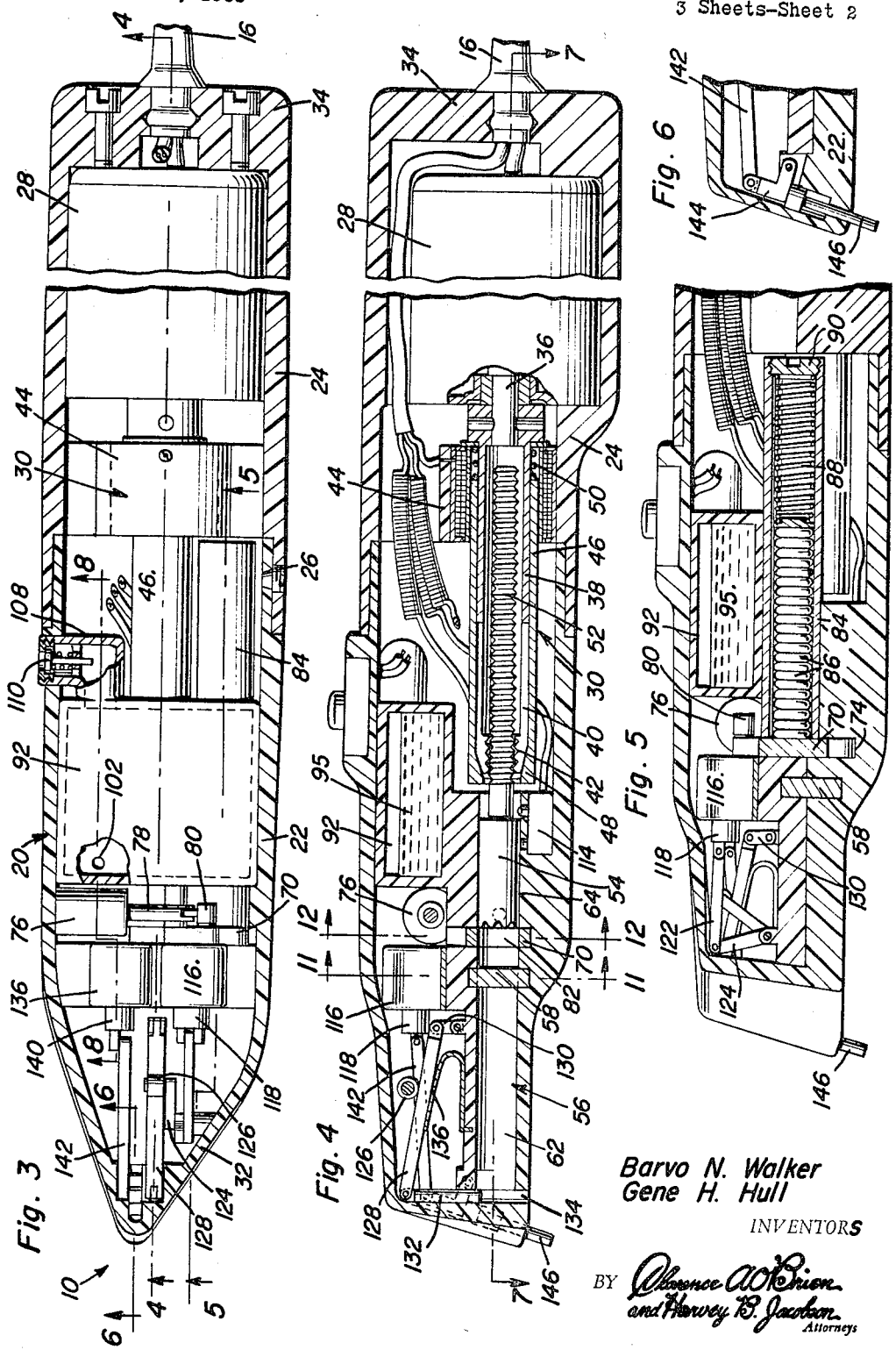
Barvo N. Walker
Gene H. Hull
INVENTORS

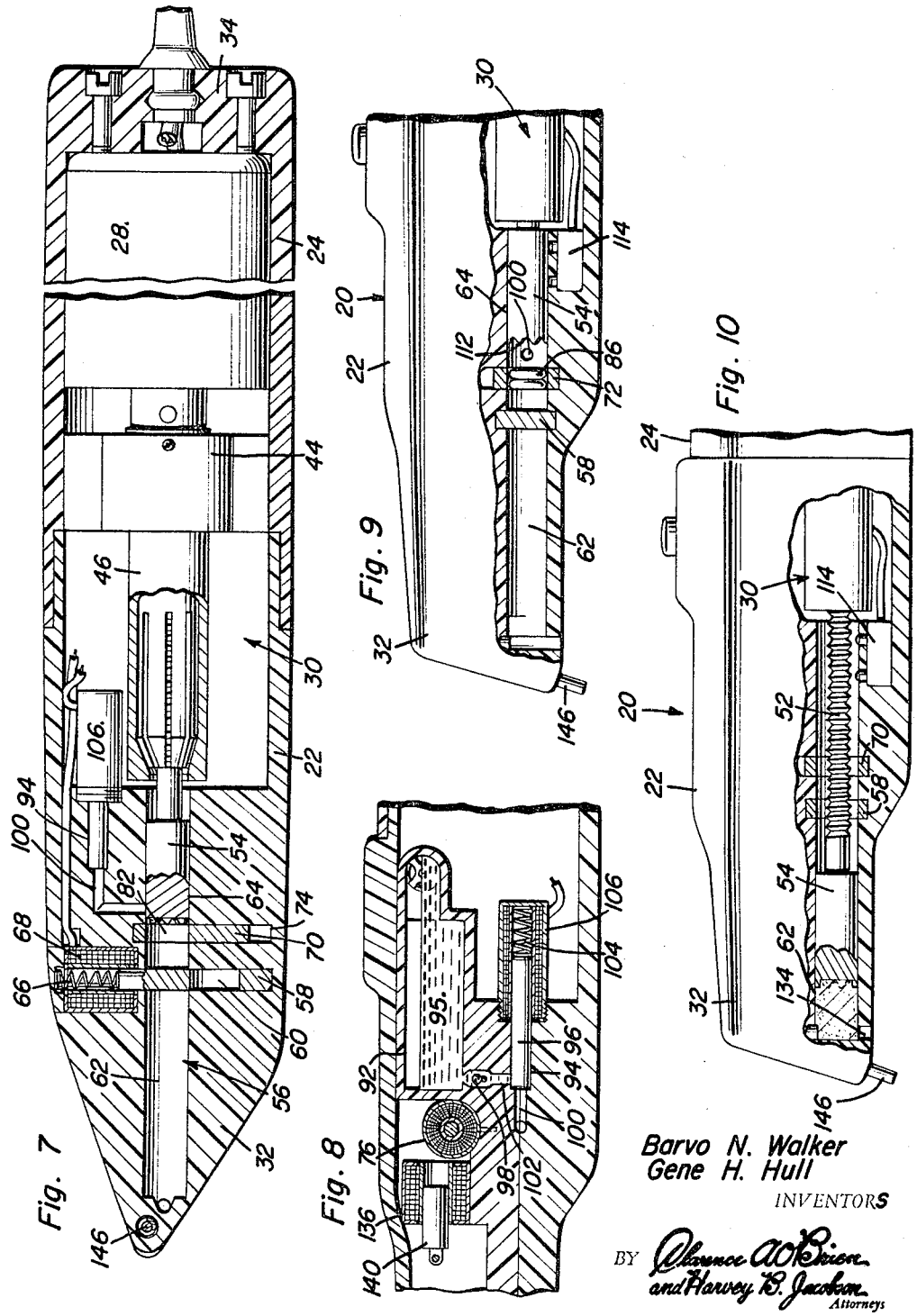

United States Patent Office 3,280,459
Patented Oct. 25, 1966

3,280,459
COMBINED AMALGAMATOR AND
DISPENSER DEVICE
Barvo N. Walker and Gene H. Hull, Fort Worth, Tex.,
assignors to The Dentists' Supply Company of New
York, York, Pa.
Filed June 5, 1963, Ser. No. 285,805
12 Claims. (Cl. 32—60)

This invention relates to a manually manipulated device particularly useful in the dental profession in facilitating the preparation of amalgam and dispensing thereof as well as packing of the amalgam into the cavity of a tooth into which it is dispensed.

The device of the present invention is concerned with the mixing or trituration of the ingredients from which dental amalgam is prepared for filling of cavities. These ingredients which consist of mercury and a silver alloy, have been heretofore measured out and mixed by separate appaartus and as a separate step before loading into an instrument from which the amalgam is ejected and then very often packed by a separate instrument. Accordingly, a considerable loss of time was involved in connection with the handling of different instruments and usually required the services of an assistant to simultaneously prepare a batch of amalgam as a previous amount is being ejected into the cavity of a patient's tooth so that it will be available when needed immediately thereafter. It is therefore a primary object of the present invention to provide a single hand-manipulated device within which a sufficiently large quantity of mercury and silver alloy may be stored to meet any demand, these ingredients being mixed into the amalgam by measured amounts as needed and also ejected from the same device which is also operative to pack or tamp the amalgam after ejection.

Another important object of the present invention is to provide a hand-manipulated implement which will store, mix and dispense ingredients under selective control of the operator.

In accordance with the foregoing objects, the device of the present invention will carry quantities of mercury and silver alloy and under selective control of the dentist, will automatically mix the mercury and alloy ingredients and dispense the resulting amalgam into a chamber from which it may be ejected under command of the operator with facilities also being provided for tamping or packing the amalgam after being ejected into the cavity of a tooth. The device is therefore housed within an elongated casing of a size convenient for handling and within which storage facilities are provided for both the mercury and silver, which storage facilities may be easily recharged when the device is not in use. A reversible electric motor is also mounted within the device and easily disassembled therefrom for repair or cleaning purposes together with a controlled piston unit operative to mix the ingredients and displace the amalgam mixture for dispensing purposes. Selectively energized facilities are also provided whereby the amalgam may be ejected and thereafter packed as hereinbefore indicated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the instrument of the present invention and associated apparatus.

FIGURE 2 is an exemplary simplified circuit diagram of a typical electric system that may be associated with the device of the present invention.

FIGURE 3 is a top sectional view taken through the device illustrated in FIGURE 1.

FIGURE 4 is a side sectional view taken substantially through a plane indicated by section line 4—4 in FIGURE 3.

FIGURE 5 is a partial sectional view taken substantially through a plane indicated by section line 5—5 in FIGURE 3.

FIGURE 6 is a partial sectional view taken substantially through a plane indicated by section line 6—6 in FIGURE 3.

FIGURE 7 is another top sectional view taken substantially through a plane indicated by section line 7—7 in FIGURE 4.

FIGURE 8 is a partial sectional view taken substantially through a plane indicated by section line 8—8 in FIGURE 3.

FIGURE 9 is a partial side elevational view of the device with parts broken away and shown in section.

FIGURE 10 is a partial side sectional view of the device with other parts broken away and shown in section.

FIGURE 11 is a transverse sectional view through the device taken substantially through a plane indicated by section line 11—11 in FIGURE 4.

FIGURE 12 is a transverse sectional view taken substantially through a plane indicated by section line 12—12 in FIGURE 4.

Referring now to the drawings in detail, it will be observed from FIGURE 1, that the device of the present invention is generally referred to by reference numeral 10 and may be associated with apparatus in the form of a control box 12 having a recess 14 within which the device 10 may be cradled for recharging with mercury, the control box 12 also housing electrical equipment necessary in connection with the operation of the device 10. Accordingly, an electrical conduit 16 operatively connects the device 10 to the control box 12 which in turn may be supplied with electrical power through the power conduit 18. All of the facilities for carrying out the various functions necessary in connection with the preparation of amalgam and filling of cavities with said amalgam, are contained within the device 10, the power and automatic control facilities on the other hand, being housed within the control box 12. The shape, construction and the specific electrical control system housed within the control box may vary as long as they accommodate the requirements of the device 10 to be hereafter described in greater detail.

Referring initially to FIGURE 3, it will be observed that the device 10 is enclosed by an elongated casing generally referred to by reference numeral 20 of such a dimension suitable for holding in the operator's hand. The casing 20 is generally tubular and may be made up of two sections 22 and 24 capable of being held in assembled relation by any suitable means such as by the setscrew element 26. The rear section 24 mounts therewithin a reversible electric motor 28 and a motor controlled assembly generally referred to by reference numeral 30 which is disassembled with the rear section 24 of the casing from the forward section 22. The forward section 22 of the casing on the other hand, includes a forwardly tapering portion 32 and houses various components of the device with which the assembly 30 cooperates to perform the various functions.

As more clearly seen in FIGURE 4, the rear section 24 of the housing fixedly mounts therewithin the reversible motor 28 and has a rear wall 34 through which the various electrical conductors extend from the conduit 16 for energization of the motor 28, various electrically operated solenoid devices and to control or program operation of the device from the electrical equipment housed within the control box 12. The assembly 30 is connected to the output shaft 36 of the motor so that it is withdrawn with the motor and the rear section from the forward section 22 into which the assembly projects. Accordingly, connected to the motor shaft 36, is an elongated sleeve member 38 having a split forward end section 40 including an internally threaded nut portion 42 adapted to be rotated by the motor. The sleeve member 38 extends through the coil section of a piston control solenoid device 44 that is mounted within the rear section 24 in axial alignment with the motor shaft 36. The solenoid device 44 therefore has associated therewith, a hollow armature member 46. The armature member 46 is provided at its forward end with an engaging portion 48 biased to a position out of engagement with the threaded portion 42 of the sleeve member 38 by means of the spring 50. The engaging portion 48 is therefore internally tapered for engagement with the externally tapered surface on the threaded portion 42 when the armature member 46 is displaced against the bias of spring 50 by energization of the solenoid device 44. The internally threaded portion 42 of the sleeve member is threadedly engaged with a screw member 52 that extends into the sleeve member. Accordingly, rotation of the sleeve member by the motor will impart axial movement to the screw member as long as no substantial axial load is placed thereon. When, however, the solenoid device 44 is energized to cause engagement of the threaded portion 42 by the armature member 46, the sleeve member 46 will be rotatively locked to the screw member for rotation therewith. It will therefore be apparent, that energization of the solenoid device 44 will produce rotation of the screw member while de-energization thereof will cause axial movement thereof as long as the screw member is not axially loaded. The direction of rotation and axial movement will of course depend upon the direction of rotation of the motor 28. The movement of the screw member may therefore be imparted to a piston member 54 which is rigidly connected to the screw member and projects into an elongated cylindrical passage 56 which is formed in the forward section 22 of the casing.

The elongated cylindrical passage 56 in the section 22 of the casing is therefore axially aligned with the assembly 30 and the piston member 54 which projects into the passage. Referring to FIGURES 4, 7 and 11, it will be observed that the passage 56 is intersected by a slidably mounted gate member 58. The gate member is provided with an opening 60 adapted to be brought into alignment with the passage 56 in order to establish communication between a delivery portion 62 of the passage 56 on one side of the gate member and a mixing portion or chamber 64 on the other side of the gate member. The gate member is therefore biased to a passage blocking position by the spring 66 that is housed within the coil section of the gate controlling solenoid 68. It will therefore be apparent, that energization of the solenoid device 68 will slidably displace the gate member 58 against the bias of the spring 66 from the position illustrated in FIGURES 4, 7 and 11 to a position such as shown in FIGURE 10 wherein the opening 60 is aligned with the passage 56 so as to unblock the passage in order to permit displacement of material through the passage as well as passage of the piston member 54 through the gate member.

Mounted in rearwardly spaced relation to the gate member 58 for movement in a plane substantially parallel thereto, is an alloy transfer carrier member 70 as more clearly seen in FIGURES 4, 7 and 12. The carrier member 70 is pivotally mounted about a pin 72 for movement within the cavity 74 formed in the casing section 22. An alloy charge solenoid device 76 is therefore mounted within the casing section 22 and is provided with an armature rod 78 projecting laterally in the casing for connection to the pivotally mounted carrier member 70 by means of the pin 80 as more clearly seen in FIGURES 3 and 12. The carrier member 70 is provided with an opening 82 which is normally aligned with the passage 56 on the mixing chamber side of the gate member 58 as more clearly seen in FIGURES 4 and 7. When however, the solenoid device 76 is energized, the carrier member 70 is pivotally displaced about the pivot pin 72 so as to bring the opening 82 therein into alignment with the forward end of an alloy storage tube 84. The tube 84 therefore contains pellets 86 of silver alloy spring-biased toward the outlet end of the tube by means of the spring 88. The rear end of the tube 84 is therefore provided with a removable closure 90 which may be removed together with the spring 88 for reloading the tube with the pellets 86. It will therefore be apparent, that when the carrier member 70 is pivotally displaced so as to bring the opening 82 therein into alignment with the outlet end of the tube 84 as shown by dotted lines in FIGURE 12, two pellets of alloy material will be displaced into the opening 82 so that when the solenoid device 76 is de-energized, the two pellets of alloy will be pivotally transferred to the mixing chamber portion 64 when the opening 82 in the carrier member is once again aligned with the passage 56.

It will therefore be appreciated, that a measured amount of silver alloy may be brought to the mixing chamber portion 64. The requisite amount of mercury must therefore also be brought to the chamber portion 64 at the same time. Accordingly, a mercury storage chamber 92 extends transversely across the casing section 22 spaced above the passage 56 as more clearly seen in FIGURES 3, 4, 5 and 8. A quantity of mercury 95 is therefore contained within the chamber 92 so that a metered amount thereof may be discharged into the mixing chamber portion 64. Toward this end, a metering chamber 94 is formed just below the storage chamber 92 as illustrated in FIGURE 8 so that when the plunger member 96 is withdrawn from the metering chamber, it will be filled with mercury from the storage chamber flowing under the force of gravity past the one-way check valve 98. The metering chamber 94 is therefore connected by the passage 100 to the mixing chamber portion 64 as more clearly seen in FIGURE 7 while a supply passage 102 within which the one-way check valve 98 is located, provides fluid communication between the bottom of the mercury storage chamber 92 and the metering chamber 94. It will therefore be apparent, that with the plunger 96 withdrawn by the bias of the spring 104 upon de-energization of the mercury supply solenoid 106, a metred quantity of mercury will be drawn into the metering chamber 94 so that when the solenoid is energized, said metered quantity of mercury will be discharged into the mixing chamber portion 64 while the one-way check valve 98 is closed by the discharge pressure. The supply of mercury 95 within the storage chamber 92 may of course be replenished when the device is cradled within the control box recess 14 as hereinbefore indicated. Accordingly, a refill inlet passage member 108 is connected to the mercury storage chamber 92 and projects from one side of the casing by a slight amount as more clearly seen in FIGURE 3. A spring-biased check valve 110 is mounted within the passage member 108 so that when the device is cradled on the control box, the storage chamber 92 may be refilled in a manner well-known to those skilled in the art.

As the pellets of silver alloy and the metered amount of mercury are brought to the mixing chamber portion 64 as hereinbefore described, the reversible electric motor 28 is energized to initially rotate in one direction so as to axially withdraw the piston member 54 to the position illustrated in FIGURE 9 so that the mixing end 112 of the piston member will expose the outlet end of the mercury supply passage 100. It will be observed, that at this instant, the gate member 58 blocks the passage 56 so that the ingredients brought to the mixing chamber portion 64 may be mixed therewithin. It will also be observed from FIGURES 4 and 9, that when the piston member 54 is initially withdrawn in a reverse direction so as to expose the outlet end of the mercury supply passage 100, a microswitch device 114 is actauted. Actuation of the microswitch 114 is thereby effective to reverse the electric motor 28 so that the piston member 54 will thereafter be axially moved in the forward direction compressing the ingredients within the mixing chamber portion 64 against the gate member 58. When the ingredients are compressed to a predetermined pressure, the piston control solenoid 44 is energized so that the piston is thereafter rotated as hereinbefore described. The solenoid device 44 is therefore maintained energized for a predetermined mixing period during which the ingredients within the chamber 64 are mixed by the rotating piston member 54. Upon termination of the mixing period, the gate controlling solenoid 68 is energized so as to displace the gate member 58 to the position illustrated in FIGURE 10 while at the same time the piston control solenoid 44 is deenergized so that the assembly 30 may thereafter resume axial displacement of the piston member. The mixed ingredients or amalgam will therefore be compressed into the delivery portion 62 of the passage by the piston member 54 moving through the gate member 58 as shown in FIGURE 10. The amalgam may then be dispensed from the device under selective control of the operator.

In order to eject the amalgam from the delivery chamber portion 62 under selective control of the operator, an ejection solenoid 116 is mounted above the gate member 58 as more clearly seen in FIGURES 3, 4, 5 and 11, energization of this solenoid being under the control of the selector switch button 120 mounted on top of the casing section 22. The solenoid armature 118 is pivotally connected to a link 122 which in turn is connected to one arm of a lever member 124 pivotally mounted within the casing section. The other arm of the lever member 124 is provided with an engaging roller element 126 which engages a link member 128 one end of which is pivotally connected to the casing by means of the link 130 while the other end is pivotally connected to an ejector rod 132. The ejector rod 132 is therefore slidably movable within the ejection passage 134 disposed at the outlet end of the delivery chamber 62. The ejection rod 132 is held in a retracted position by means of the spring 136 which biases the link member 128 upwardly. It will therefore be apparent, that the operator by depressing the selector button 120, will cause energization of the solenoid 116 so as to pivotally displace the link member 128 against the bias of the spring 136. The ejector rod 132 will thereby be slidably displaced so as to eject from the delivery chamber portion 62, an incremental amount of amalgam at the forward end portion of the casing. The forward end of the casing is therefore conveniently shaped for ejection of this incremental amount of amalgam into the cavity of a patient's tooth.

Mounted within the forward section of the casing alongside of the solenoid 116, in a transverse direction, is a tamping solenoid 136 as more clearly seen in FIGURES 3, 8 and 11. Energization of the solenoid 136 may therefore be under the selective control of the operator through the switch button 138. The armature 140 of the solenoid 136 is preferably connected to a link member 142 the forward end of which is connected to a hammer element 144 pivotally mounted adjacent the forward end of the casing as more clearly seen in FIGURE 6. The hammer element 144 therefore bears against the upper end of a tamping rod 146 which is vibrated by its engagement with the hammer element and projects from the forward end of the casing is spaced adjacency to the amalgam ejection passage 134. Accordingly, after amalgam is ejected into the cavity of a patient's tooth, the selector button 138 may be depressed in order to supply an energizing voltage to the solenoid 136 having a sawtooh wave form so that the tamping rod 146 will be vibrated at a predetermined frequency deemed adequate to pack the amalgam.

It will be apparent from the foregoing, that the ejection of amalgam from the delivery chamber portion 62 and the tamping of the amalgam after ejection will be under the selective control of the operator through the selector buttons 120 and 138. The automatic sequence of operations described in connection with the delivery of measured amounts of alloy and mercury to the mixing chamber portion, mixing of the ingredients therewithin and displacement of the mixed amalgam into the delivery portion, will be started by depression of the selector switch button 148 which is operative to inititally pulse the alloy charge solenoid 76, and in proper sequence thereafter, the mercury supply solenoid 106 together with energization of the motor 28 for rotation in one direction. Referring therefore to FIGURE 2, one exemplary control circuit is illustrated whereby programmed operation of the device 10 may be achieved. Actuation of the start button 148 will therefore pulse the alloy charge solenoid 76 from the source of electrical energy 150 in order to transfer two pellets of silver alloy from the supply tube 84 to the mixing chamber portion 64. Actuation of the start switch 148 will also close a cycle start switch 152 associated with the control system so that the program cycle may then begin including the pulsing of the mercury supply solenoid 106 so as to discharge a metered quantity of mercury from the metering chamber 94 by projection thereinto. Also, the motor 28 will be energized for rotation in one direction through a reverse switch 154 that may be housed within the control box 12. Current may also be routed through a timer device 156 so that when the piston member 54 is initially retracted by a limited amount to actuate the limit switch 114, the piston control solenoid 44 may be energized and at the same time, the reverse switch 154 rendered operative to reverse the direction of rotation of the motor 28. The piston 54 will then be rotated for mixing purposes for the mixing period preset by the timer device 156. Upon termination of the mixing period, the timer device will then route the current so as to cause energization of the gate solenoid 68 while at the same time de-energizing the piston control solenoid 44 so that axial movement of the piston member may then be resumed. The amalgam mixed within the mixing chamber will then be displaced into the delivery chamber and compressed therewithin by the piston member. The operator may then eject an incremental amount of amalgam by actuation of the ejection switch 120 which pulses the ejection solenoid 116. This may then be followed by actuation of the tamping switch 138 operative to supply the tamping solenoid with a sawtooth voltage from any suitable sawtooth voltage generator 158 that may also be housed within the control box 12. While the amalgam is being packed, another batch of amalgam may be mixed within the device so that it will be immediately available. The control equipment housed within the control box may therefore mount various controls including a timer knob 160 associated with the timer 156 whereby the mixing period may be preset as desired. Also, a frequency control knob 162 is provided in association with the sawtooth voltage generator so that the frequency with which the tamping rod is vibrated may be selected.

From the foregoing description, the construction, operation and utility of the device of the present invention will be apparent. It will therefore be appreciated, that the present invention will effect a significant savings in time for the dentist, facilitate the packing and condensing of an alloy in the amalgam and eliminate the need for an assistant in connection with the preparation of amalgam and filling of cavities therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a device for storing, mixing and dispensing, elongated passage means, piston means movable within said passage means for displacing and mixing ingredients therein, movably mounted gate means for blocking movement of the ingredients through said passage means, storage means, means for transferring measured amounts of the ingredients from the storage means to the passage means, and means for sequentially imparting axial movement and rotation to the piston means when the passage means is blocked by the gate means to receive and mix the ingredients in the passage means, and means operative on the gate means to unblock the passage means and cause resumption of axial movement of the piston means through the gate means for dispensing the mixed ingredients.

2. An implement for storing ingredients, mixing measured amounts thereof, and dispensing a mixture of said ingredients comprising, a casing, at least two reservoirs mounted within said casing for respectively storing said ingredients therein, mixing chamber means mounted in said casing in spaced relation to said reservoirs, selectively operable means for simultaneously withdrawing said measured amounts of the ingredients from the reservoirs to deliver the ingredients to the mixing chamber means, delivery chamber means mounted in the casing for receiving said mixture of ingredients from the mixing chamber means, gate means operatively positioned between the delivery chamber means and the mixing chamber means for controlling the movement of ingredients therebetween, motor operated means for sequentially drawing the ingredients into the mixing chamber means, mixing the ingredients therein and compressing the mixture into the delivery chamber means upon opening of the gate means, and selectively operated ejector means for dispensing predetermined amounts of said compressed mixture from the delivery chamber means.

3. The combination of claim 2 including tamping means mounted in the casing in close spaced adjacency to the ejector means for packing the mixture after dispensing thereof.

4. The combination of claim 3, wherein said selectively operable means comprises, transfer means movably mounted within the casing for displacement between two positions operatively aligned respectively with the mixing chamber means and one of said reservoirs, the ingredient in said one reservoir being in pellet form and biased into the transfer means when in one of said operatively aligned positions, selectively energized charging means operatively connected to the transfer means for displacement thereof to said one position, the ingredient in the other of said reservoirs being in a fluent state, metering chamber means operatively connected to said other reservoir for receiving the fluent ingredient therefrom and pressurizing means operated simultaneously with said selectively energized charging means for discharging the metering chamber means.

5. The combination of claim 4 wherein said motor operated means comprises, a rotatable member having a threaded portion, piston means threadedly engaged by the threaded portion of the rotatable member for axial movement through the mixing chamber means and the delivery chamber means in response to rotation of the rotatable member, power operated means engageable with the threaded portion of the rotatable member for rotating the piston means with the rotatable member, and means responsive to axial movement of the piston means in a reverse direction by a limited amount for reversing rotation of the rotatable member to produce axial movement in a forward direction and rotation during a mixing period when the power operated means is engaged with the rotatable member.

6. The combination of claim 5 wherein said gate means comprises, a gate member movably mounted in the casing blocking communication between the mixing chamber means and the delivery chamber means prior to and during said mixing period, and means operative upon termination of the mixing period for displacing the gate member to establish communication between the chamber means and permit movement of the piston means therethrough.

7. The combination of claim 6, wherein said one ingredient in pellet form is a silver alloy and the other ingredient in a fluent state is mercury, said ingredients being mixed to form dental amalgam as the mixture dispensed from the delivery chamber means.

8. The combination of claim 2, wherein said selectively operable means comprises, transfer means movably mounted within the casing for displacement between two positions operatively aligned respectively with the mixing chamber means and one of said reservoirs, the ingredient in said one reservoir being in pellet form and biased into the transfer means when in one of said operatively aligned positions, selectively energized charging means operatively connected to the transfer means for displacement thereof to said one position, the ingredient in the other of said reservoirs being in a fluent state, metering chamber means operatively connected to said other reservoir for receiving the fluent ingredient therefrom and pressurizing means operated simultaneously with said selectively energized charging means for discharging the metering chamber means into the mixing chamber means.

9. The combination of claim 8, wherein said one ingredient in pellet form is a silver alloy and the other ingredient in a fluent state is mercury, said ingredients being mixed to form dental amalgam as the mixture dispensed from the delivery chamber means.

10. The combination of claim 2 wherein said motor operated means comprises, a rotatable member having a threaded portion, piston means threadedly engaged by the threaded portion of the rotatable member for axial movement through the mixing chamber means and the delivery chamber means in response to rotation of the rotatable member, power operated means engageable with the threaded portion of the rotatable member for rotating the piston means with the rotatable member, and means responsive to axial movement of the piston means in a reverse direction by a limited amount for reversing rotation of the rotatable member to produce axial movement in a forward direction and rotation during a mixing period when the power operated means is engaged with the rotatable member.

11. The combination of claim 10 wherein said gate means comprises, a gate member movably mounted in the casing blocking communication between the mixing chamber means and the delivery chamber means prior to and during said mixing period, and means operative upon termination of the mixing period for displacing the gate member to establish communication between the chamber means and permit movement of the piston means therethrough.

12. A hand manipulated instrument for storing, measuring, mixing, dispensing and tamping dental amalgam comprising, an elongated casing having a passage formed therein, a gate member movably mounted in the casing for blocking the passage between mixing and delivery portions thereof, a piston movably mounted in the passage for axial and rotational movement, a mercury storage chamber mounted in said casing, a metering chamber operatively interconnecting the storage chamber and the mixing portion of the passage, solenoid operated plunger means for discharging a measured amount of mercury from the metering chamber into the mixing portion, a tube mounted in the casing containing pellets of an alloy for mixing with the mercury in the mixing portion of the passage, a carrier member having an opening therein for displacement between two positions respectively communicating with the tube and the passage for transferring pellets from the tube to the mixing portion of the passage, a motor operated assembly mounted by the casing for disassembly from one end thereof in axial spaced relation to the passage to impart said movement to the piston for mixing and displacing the amalgam through the passage, and solenoid operated means mounted in the casing adjacent the other end thereof for ejecting the amalgam from the delivery portion of the passage and tamping the amalgam so ejected, said motor operated assembly including, a reversible motor, an elongated sleeve rotated by the motor and having an internally threaded portion, a screw member connected to the piston and threadedly engaged by the threaded portion of the sleeve and a solenoid operated control member engageable with the threaded portion of the sleeve for rotatively locking the sleeve to the screw member for rotation of the piston with the sleeve.

References Cited by the Examiner

UNITED STATES PATENTS

| 3,040,934 | 6/1962 | Weiner | 222—137 |
| 3,067,987 | 12/1962 | Ballou | 259—7 |

FOREIGN PATENTS

| 309,333 | 4/1929 | Great Britain. |
| 934,235 | 8/1963 | Great Britain. |

RICHARD A. GAUDET, *Primary Examiner.*

J. W. HINEY, Jr. *Assistant Examiner.*